United States Patent [19]

Osenbaugh et al.

[11] Patent Number: 5,055,095
[45] Date of Patent: Oct. 8, 1991

[54] SPRING LOADED PINION GEARS FOR DIFFERENTIAL

[75] Inventors: Carl D. Osenbaugh, Ft. Wayne; Howard Reaser, Columbia City, both of Ind.

[73] Assignee: Dana Corporation, Toledo, Ohio

[21] Appl. No.: 634,002

[22] Filed: Dec. 26, 1990

[51] Int. Cl.⁵ .............................................. F16H 1/44
[52] U.S. Cl. ..................................... 475/233; 475/240
[58] Field of Search ................ 475/231, 233, 235, 240

[56] References Cited

FOREIGN PATENT DOCUMENTS 1255153  3/1960  France .

Primary Examiner—Dirk Wright
Attorney, Agent, or Firm—MacMillian, Sobanski & Todd

[57] ABSTRACT

A limited slip differential includes a case which is rotatably driven by a power source. A cross shaft is mounted within the case for rotation therewith. A pair of pinion gears are rotatably mounted on the ends of the cross shaft. The pinion gears mesh with side gears splined onto respect axle shafts. Thus, when the case is rotated, torque is transmitted through the cross shaft, the pinion gears, and the side gears to the axle shafts. A pair of Belleville springs are mounted to the cross shaft adjacent to the pinion gears. A hollow cylindrical spacer is disposed about the cross shaft between the two Belleville springs. The Belleville springs react against the ends of the spacer to urge the pinion gears apart from one another into frictional engagement with respective thrust washers disposed between the pinion gears and the case. As a result, the rotation of the pinion gears is restricted, thus limiting the free wheeling action of the differential. In an alternative embodiment, four pinion gears are provided within the differential having respective Belleville springs.

10 Claims, 4 Drawing Sheets

SPRING LOADED PINION GEARS FOR DIFFERENTIAL

BACKGROUND OF THE INVENTION

This invention relates in general to differential gear mechanisms and in particular to a limited slip differential having pinion gears which are spring loaded by Belleville springs.

Differential gear mechanisms, commonly referred to simply as differentials, are well known devices which are frequently used in the drive trains of most vehicles. The differential is usually connected between an input driving shaft (typically a drive shaft from the vehicle engine) and a pair of output driven shafts (typically a pair of axle shafts connected to the vehicle wheels). The differential distributes torque from the input shaft equally to the two output shafts, while permitting such output shafts to rotate at different speeds under certain conditions. As a result, torque is supplied to both wheels of the vehicle as it negotiates a turn, while permitting the outside wheel to turn faster than the inside wheel.

In a conventional open differential, the movements of the various internal components of the differential are not restricted in any significant fashion. Thus, the differential functions in the desirable manner described above under most circumstances. However, when one of the wheels of the vehicle loses traction with the ground, such as can occur on wet or icy surfaces, the differential will reduce the amount of torque supplied to the other wheel. Consequently, the vehicle can become immobilized. To prevent this from occurring, some differentials are provided with an operator actuated locking device. When actuated, the locking device completely restricts the movement of the internal components of the differential, thereby providing full torque from the engine to both wheels. At the same time, however, both wheels are driven at exactly the same speed. Thus, locked differentials are not well suited for use on non-slippery surfaces.

In order to prevent a vehicle from becoming immobilized under most driving conditions, it is not necessary to completely lock the differential. Rather, it is generally necessary only to partially restrict the movement of the internal components of the differential. Such limited restriction prevents a free wheeling, no-torque situation from occurring, as described above with respect to the open differential, but still permits the wheels to rotate at different speeds during cornering. Devices of this type are generally referred to as limited slip differentials and are often provided with some means for increasing the amount of friction between the internal components of the differential so as to partially restrict the free movement thereof.

SUMMARY OF THE INVENTION

This invention relates to an improved structure for a limited slip differential. The differential includes a case which is rotatably driven by a power source. A cross shaft is mounted within the case for rotation therewith. A pair of pinion gears are rotatably mounted on the ends of the cross shaft. The pinion gears mesh with side gears splined onto respect axle shafts. Thus, when the case is rotated, torque is transmitted through the cross shaft, the pinion gears, and the side gears to the axle shafts. A pair of Belleville springs are mounted on the cross shaft adjacent to the pinion gears. A hollow cylindrical spacer is disposed about the cross shaft between the two Belleville springs. The Belleville springs react against the ends of the spacer to urge the pinion gears apart from one another into frictional engagement with respective thrust washers disposed between the pinion gears and the case. As a result, the rotation of the pinion gears is partially restricted, thus limiting the free wheeling action of the differential. In an alternative embodiment, four pinion gears are provided within the differential having respective Belleville springs.

It is an object of this invention to provide an improved structure for a limited slip differential.

It is another object of this invention to provide such a limited slip differential using Belleville springs to generate friction between the pinion gears and the differential case to limit the free wheeling action of the differential.

Other objects and advantages of this invention will become apparent to those skilled in the art from the following detailed description of the preferred embodiments, when read in light of the following drawings.

DETAILED DESCRIPTION OF THE PREFERRED EMBODIMENTS

Figure 1:
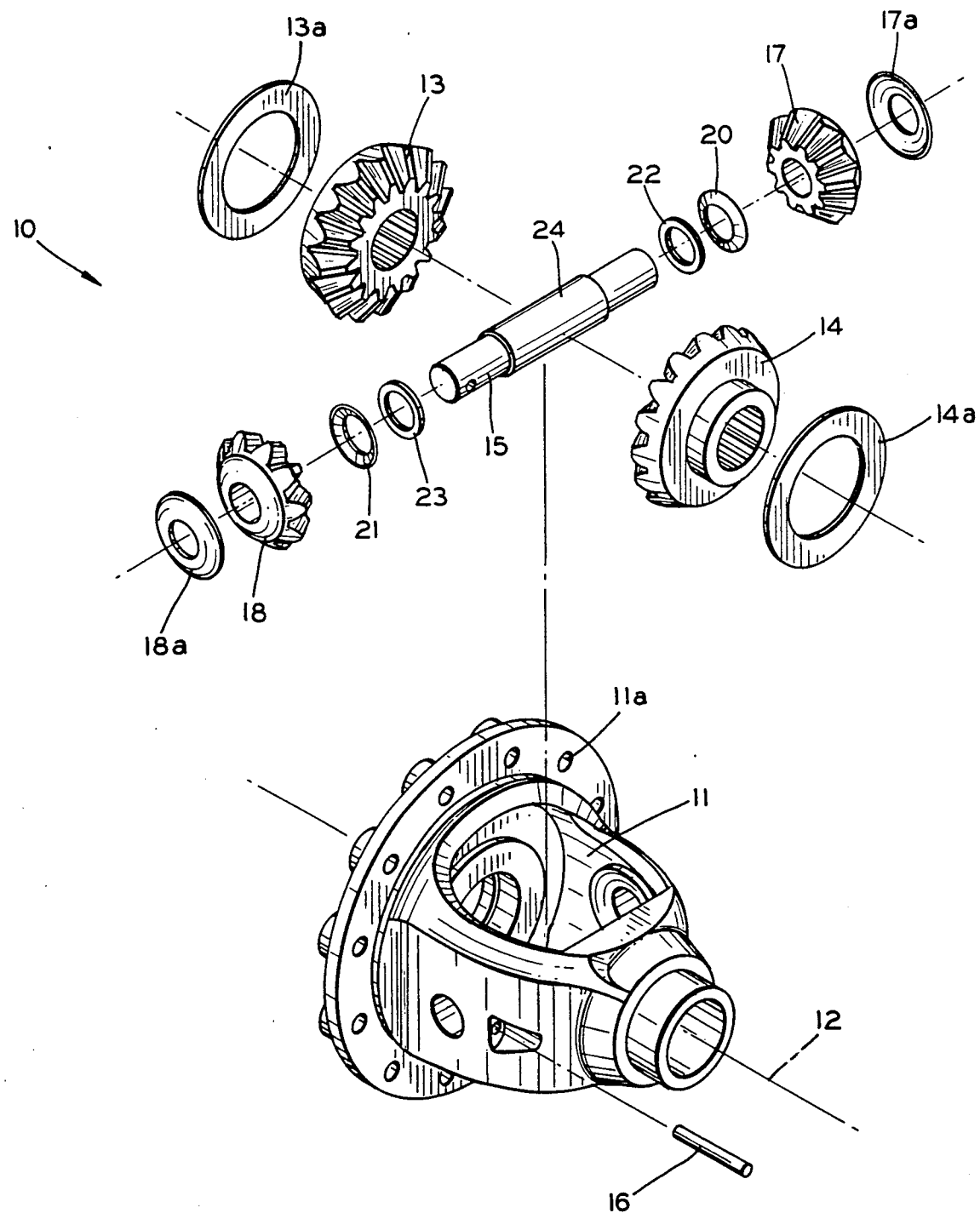
FIG. 1 is an exploded view of a first embodiment of a differential in accordance with this invention.
Figure 2:
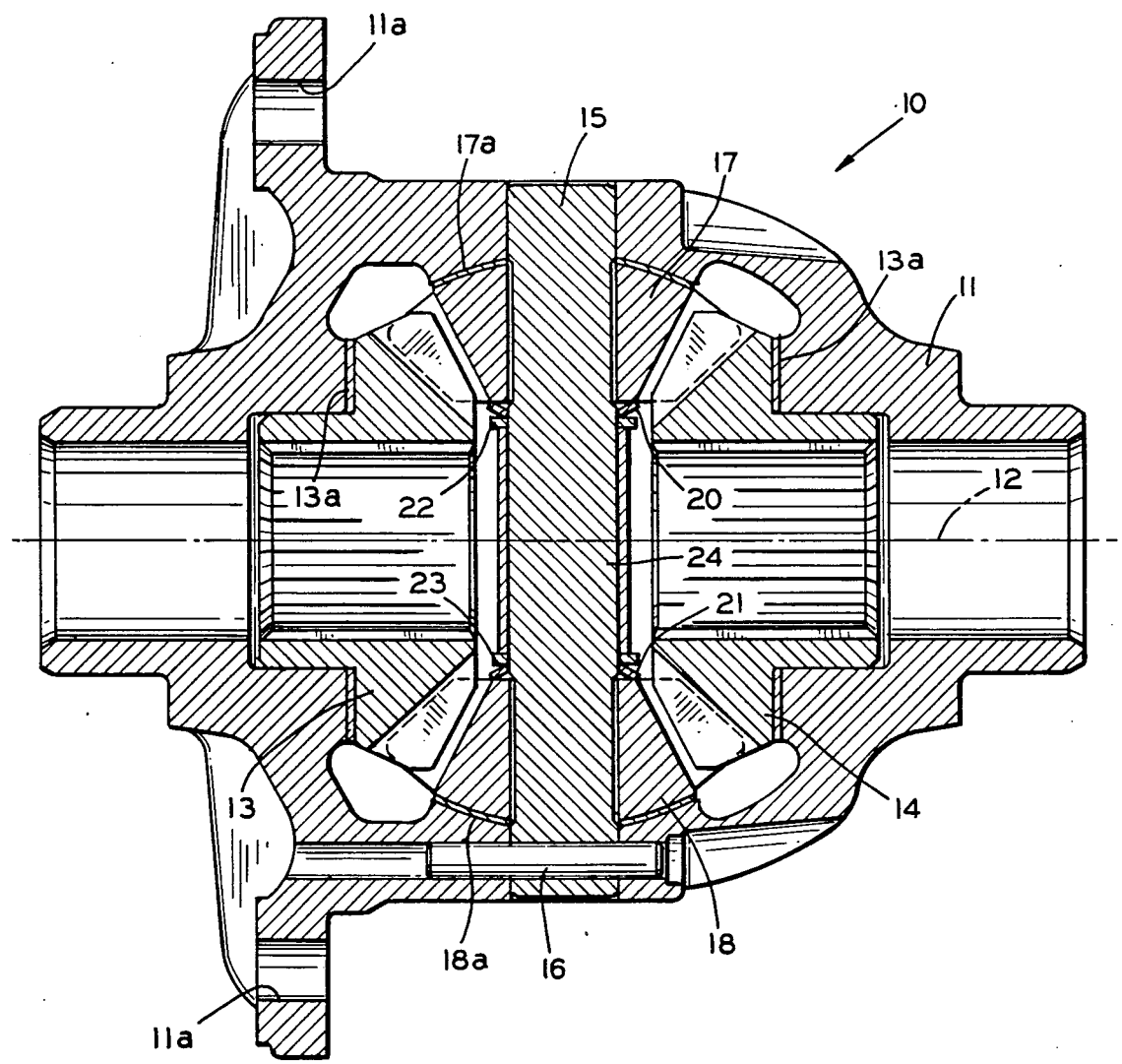
FIG. 2 is a sectional elevational view of the differential illustrated in FIG. 1.

Referring now to the drawings, there is illustrated in FIGS. 1 and 2 a first embodiment of a vehicle differential, indicated generally at 10, in accordance with this invention. The differential 10 includes a case 11 which is adapted to be rotatably supported within an axle housing (not shown) in a known manner. The case 11 includes a circumferentially extending flange portion having a plurality of apertures 11a formed therethrough. The apertures 11a are provided to secure a ring gear (not shown) to the case 11. The ring gear meshes with other components of the drive train of the vehicle so as to rotate the case 11 about an axis 12 within the housing.

A pair of side gears 13 and 14 are disposed within the case 11 for rotation about the axis 12. Respective thrust washers 13a and 14a are disposed between the side gears 13 and 14 and the case 11. The side gears 13 and 14 are adapted to be splined onto respective axle shafts (not shown) which extend axially outwardly from the case 11. A cross shaft 15 extends through the case 11 between the side gears 13 and 14, transversely to the axis 12. The ends of the cross shaft 15 are received in respective aligned apertures formed through the case 15. A retaining pin 16 is pressed into aligned apertures formed in the cross pin 15 and the case 11 for retaining the cross shaft 15 within the case 11. A pair of pinion gears 17 and 18 are rotatably mounted on the ends of the cross shaft 15. Respective thrust washers 17a and 18a are disposed between the pinion gears 17 and 18 and the case 11. The pinion gears 17 and 18 mesh with the side gears 13 and 14 in a known manner to form the basic structure of the differential 10.

Means are provided for urging the pinion gears 17 and 18 apart from one another into frictional engagement with the thrust washers 17a and 18a, respectively. In the embodiment illustrated in FIGS. 1 and 2, this means for urging includes a pair of Belleville springs 20 and 21 disposed about the cross shaft 15 adjacent to the pinion gears 17 and 18. The term "Belleville spring" as used herein refers to a dish-shaped or cone-shaped resilient member, typically formed from a generally annular strip of metal. Respective washers 22 and 23 are disposed about the cross shaft 15 adjacent to the Belleville springs 20 and 21. A hollow cylindrical spacer 24 is also disposed about the cross shaft 15, extending between the two washers 22 and 23.

When the differential 10 is assembled as shown in FIG. 2, the Belleville springs 20 and 21 react against the ends of the spacer 24 so as to exert forces against the pinion gears 17 and 18. As a result, the pinion gears 17 and 18 are urged into frictional engagement with the thrust washers 17a and 18a, respectively. The thrust washers 17a and 18a are, in turn, urged into frictional engagement with the case 11. As a result, the ability of the pinion gears 17 and 18 to rotate relative to the cross shaft 15 is partially restricted because of the frictional forces generated by the Belleville springs 20 and 21. Therefore, the ability of the side gears 13 and 14 to rotate at different speeds relative to one another is similarly restricted. The axial length of the spacer 24 is selected to provide desired magnitudes for the frictional engagement forces.

In operation, when the vehicle is travelling straight, the case 11 and the cross shaft 15 rotate together, but the pinion gears 17 and 18 do not rotate relative to the cross shaft 15. Thus, no speed differentiation occurs, and the side gears 13 and 14 (as well as the axle shafts splined thereto) are driven at the same speed. When the vehicle turns a corner, the pinion gears 17 and 18 rotate about the cross shaft 15. As a result, one side gear 13 will accelerate relative to the rotational speed of the case 11, while the other side gear 14 will decelerate a similar amount relative to such rotational speed.

Such differentiation in speed permits one axle shaft to rotate at a greater speed than the other, but still maintains equal torque distribution between the two axle shafts. The frictional forces generated by the Belleville springs 20 and 21 tends to restrict the ability of the differential 10 to differentiate during cornering. However, as described above, this restriction is desirable to prevent a free wheeling, no-torque situation from occurring, as can occur with an open differential.

Figure 3:
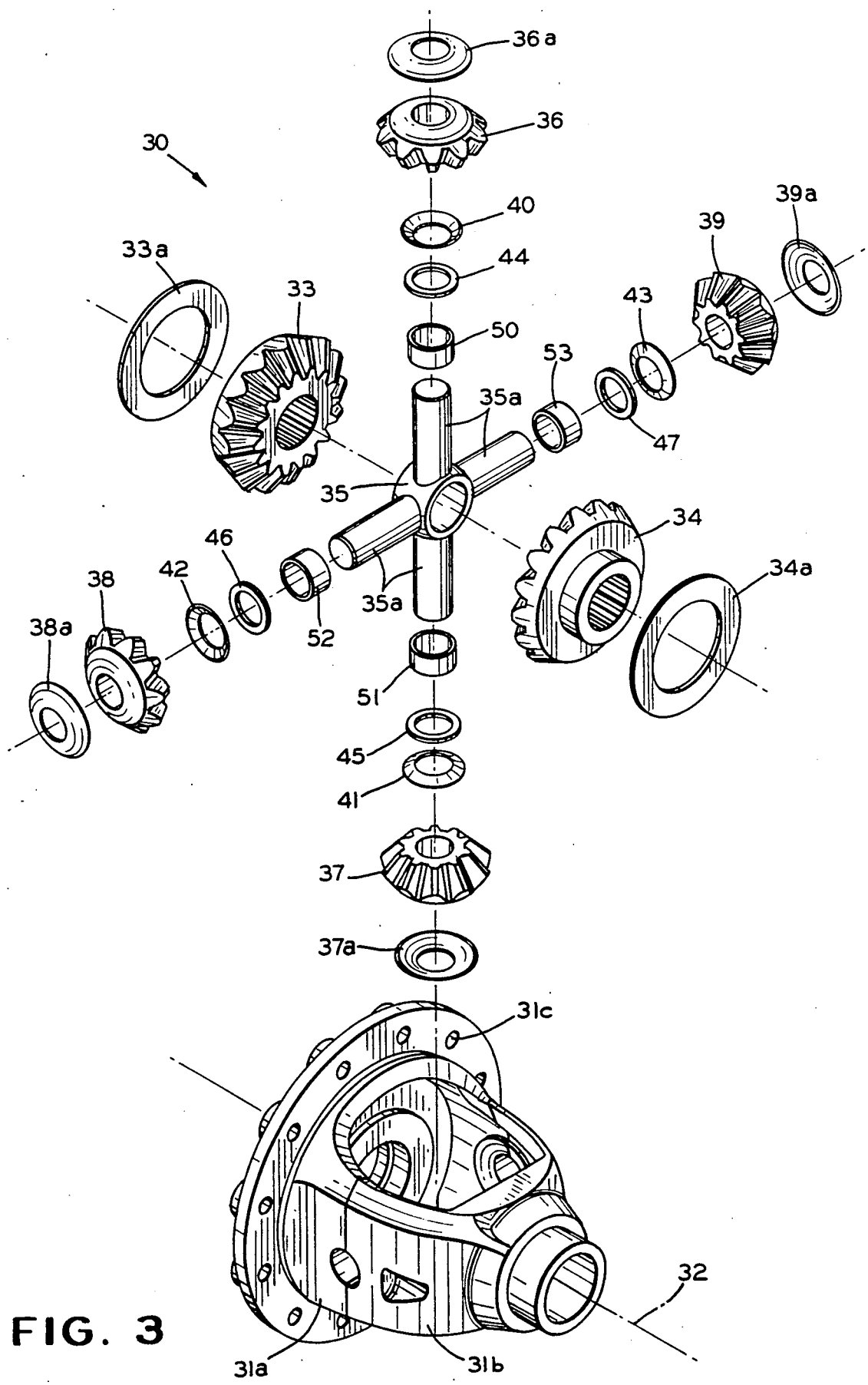
FIG. 3 is an exploded view view of a second embodiment of a differential in accordance with this invention.
Figure 4:
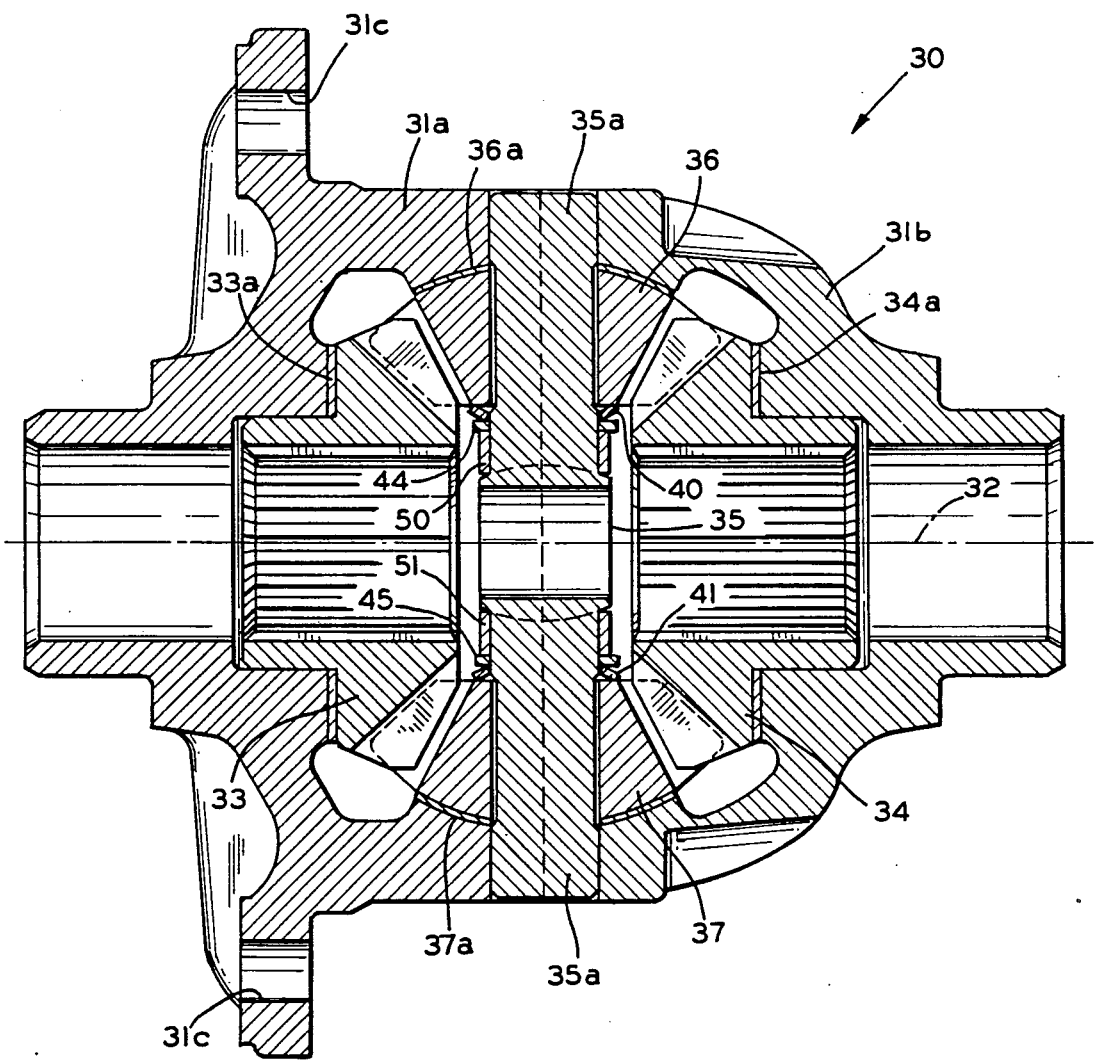
FIG. 4 is a sectional elevational view of the differential illustrated in FIG. 2.

Referring now to FIGS. 3 and 4, there is illustrated a second embodiment of a differential, indicated generally at 30, in accordance with this invention. The differential 30 includes a case 31 formed from two halves 31a and 31b which are secured together by conventional means. The case 31 is adapted to be rotatably supported within an axle housing (not shown) in a known manner. The case half 31a includes a circumferentially extending flange portion having a plurality of apertures 31c formed therethrough. The apertures 31a are provided to secure a ring gear (not shown) to the case 31. The ring gear meshes with other drive train components so as to rotate the case 31 about an axis 32 within the housing.

A pair of side gears 33 and 34 are disposed within the case 31 for rotation about the axis 32. Respective thrust washers 33a and 34a are disposed between the side gears 33 and 34 and the case 31. The side gears 33 and 34 are adapted to be splined onto respective axle shafts (not shown) which extend axially outwardly from the case 31. A cross spider 35 is disposed within the case 31. The cross spider 35 includes four outwardly extending trunnions 35a which lie in a plane extending transversely to the axis 32. The ends of the trunnions 35a of the cross spider 35 are received in respective apertures formed through the case 35. Pinion gears 36, 37, 38, and 39 are rotatably mounted on the trunnions 35a of the cross spider 35. Respective thrust washers 36a, 37a, 38a, and 39a are disposed between the pinion gears 36, 37, 38, and 39 and the case 31. The pinion gears 36, 37, 38, and 39 mesh with the side gears 33 and 34 in a known manner to form the basic structure of the differential 30.

Means are provided for urging the pinion gears 36, 37, 38, and 39 apart from one another into frictional engagement with the thrust washers 36a, 37a, 38a, and 39a. In the embodiment illustrated in FIGS. 3 and 4, this means for urging includes Belleville springs 40, 41, 42, and 43 which are disposed about each of the trunnions 35a of the cross spider 35 adjacent to the respective pinion gears 36, 37, 38, and 39. Respective washers 44, 45, 46, and 47 are disposed about the trunnions 35a of the cross spider 35 adjacent to the Belleville springs 40, 41, 42, and 43. A hollow cylindrical spacer 50, 51, 52, and 53 is also disposed about the each of the trunnions 35a of the cross spider 35. The operation of the differential 30 is identical to the operation of the differential 10 described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A limited slip differential comprising:
   a case;
   a cross shaft mounted within said case for rotation therewith;
   a pair of side gears mounted within said case for relative rotation;
   a pair of pinion gears mounted on said cross shaft for relative rotation, said pinion gears meshing with said side gears; and
   means for urging one of said pinion gears into frictional engagement with said case, said means for urging including a Belleville spring mounted on said cross shaft and engaged with said pinion gear.

2. The invention defined in claim 1 wherein said means for urging urges both of said pinion gears apart from one another into frictional engagement with said case.

3. The invention defined in claim 2 wherein said means for urging further includes two Belleville springs mounted on said cross shaft and respectively engaged with said pinion gears.

4. The invention defined in claim 3 wherein said means for urging further includes a spacer mounted on said cross shaft between said Belleville springs, said Belleville springs reacting against ends of said spacer to urge said pinion gears into frictional engagement with said case.

5. The invention defined in claim 4 wherein said means for urging further includes a pair of washers mounted on said cross shaft between said ends of said spacer and said Belleville springs.

6. A limited slip differential comprising:
   a case;

a cross spider mounted within said case for rotation therewith, said cross spider having four outwardly extending trunnions;

a pair of side gears mounted within said case for relative rotation;

a pinion gear mounted on each of said cross spider trunnions for relative rotation, said pinion gears meshing with said side gears; and means for urging one of said pinion gears into frictional engagement with said case including a Belleville spring mounted on said cross shaft and engaged with said pinion gear.

7. The invention defined in claim 6 wherein said means for urging urges all of said pinion gears apart from one another into frictional engagement with said case.

8. The invention defined in claim 7 wherein said means for urging further includes a Belleville spring mounted on each of said cross spider trunnions and respectively engaged with said pinion gears.

9. The invention defined in claim 8 wherein said means for urging further includes a spacer mounted on each of said cross spider trunnions adjacent said Belleville springs, said Belleville springs reacting against ends of said spacers to urge said pinion gears into frictional engagement with said case.

10. The invention defined in claim 9 wherein said means for urging further includes a washer mounted on each of said cross spider trunnions between said ends of said spacers and said Belleville springs.

* * * * *